(12) United States Patent
Chen

(10) Patent No.: US 12,619,286 B2
(45) Date of Patent: May 5, 2026

(54) MAGNETIC FIXING ASSEMBLY OF SCREEN PROTECTOR

(71) Applicant: VicRound Limited Company, Taipei City (TW)

(72) Inventor: Shui-Chin Chen, Taipei City (TW)

(73) Assignee: VICROUND LIMITED COMPANY, Taipei City (TW)

( * ) Notice: Subject to any disclaimer, the term of this patent is extended or adjusted under 35 U.S.C. 154(b) by 107 days.

(21) Appl. No.: 18/888,182

(22) Filed: Sep. 18, 2024

(65) Prior Publication Data

US 2026/0050292 A1 Feb. 19, 2026

(30) Foreign Application Priority Data

Aug. 13, 2024 (TW) ................................. 113208679

(51) Int. Cl.
*G06F 1/16* (2006.01)
(52) U.S. Cl.
CPC .......... *G06F 1/1656* (2013.01); *G06F 1/1601* (2013.01)
(58) Field of Classification Search
CPC .... G06F 1/1609; G06F 1/1603; G06F 1/1607; G06F 1/1616; G06F 1/1626; G06F 1/1637; G06F 1/1686; G06F 1/16; G06F 1/1601; G06F 1/1611; G06F 1/1656; G06F 1/1698; H04N 5/65; G02B 7/006; G02B 7/20
See application file for complete search history.

(56) References Cited

U.S. PATENT DOCUMENTS

| | | | | |
|---|---|---|---|---|
| 4,905,089 A | * | 2/1990 | Liang | G06F 1/1609 348/E5.131 |
| D338,194 S | * | 8/1993 | Hartwig | D14/450 |
| 5,526,180 A | * | 6/1996 | Rausnitz | G02B 7/006 359/601 |
| 5,668,612 A | * | 9/1997 | Hung | G06F 1/1609 348/820 |
| 5,746,408 A | * | 5/1998 | Theirl | H04N 5/65 348/E5.131 |
| 5,797,570 A | * | 8/1998 | Dolan | H04N 5/65 348/E5.131 |
| 6,967,635 B2 | * | 11/2005 | Hung | G06F 1/1609 345/32 |
| 7,965,498 B2 | * | 6/2011 | Gotham | G06F 1/1607 438/455 |

(Continued)

FOREIGN PATENT DOCUMENTS

| CN | 104460861 A | * | 3/2015 | G02B 5/208 |
|---|---|---|---|---|

*Primary Examiner* — Abhishek M Rathod
(74) *Attorney, Agent, or Firm* — WPAT, PC

(57) ABSTRACT

A magnetic fixing assembly for a screen protector is configured to detachably install a screen protector on a surface of a display screen and has a fixing unit and a magnetic unit. The fixing unit has a first adhesive sheet, such that the fixing unit can be attached to a border of the display screen. The magnetic unit has a connecting part, an extending part, and at least one magnet. The connecting part is detachably mounted on the fixing unit, and the at least one magnet is mounted on the connecting part, such that the magnetic unit and the fixing unit are magnetically attracted to each other. The extending part extends from a side of the connecting part, and the screen protector can be attached to the extending part. Therefore, the screen protector can be detached from the display screen.

8 Claims, 5 Drawing Sheets

(56) References Cited

U.S. PATENT DOCUMENTS

| | | | |
|---|---|---|---|
| 8,488,306 B2 * | 7/2013 | Mickey | F16M 13/022 |
| | | | 361/679.04 |
| 10,380,384 B2 * | 8/2019 | Li | G06F 1/1609 |
| D1,066,348 S * | 3/2025 | Swartz | D14/450 |
| 2022/0163763 A1 * | 5/2022 | Li | G06F 1/1609 |
| 2024/0045167 A1 * | 2/2024 | Swartz | G02B 7/006 |

* cited by examiner

MAGNETIC FIXING ASSEMBLY OF SCREEN PROTECTOR

BACKGROUND OF THE INVENTION

1. Field of the Invention

The present invention relates to a fixing assembly of a screen protector, especially to a magnetic fixing assembly that can detachably fix a screen protector on a surface of a display screen.

2. Description of the Prior Arts

As technology advances day by day, desktop computers, notebook computers, smart phones, etc. have become necessary electronic products in life. Depending on different purposes, the user can attach screen protectors with different functions to the surface of the display screen of electronic products. For example, the user can purchase a screen protector with anti-scratch and anti-impact functions to prevent the display screen from being cracked or scratched by impact. The user can purchase a screen protector with anti-blue light function to protect their eyes. The user can purchase a screen protector with anti-peep function to limit the angle at which the display screen can be seen, thus protecting the user's privacy.

The conventional screen protectors are mostly installed on the surface of the display screen by being directly adhered or frame-fitted. If the screen protector is installed on the surface of the display screen by adhesive, the user cannot remove the screen protector or replace it with a screen protector with different functions at any time. In addition, when the adhered screen protector is removed from the surface of the display screen, adhesive residue will be left on the surface of the display screen or the structure of the screen protector will be damaged. If the screen protector is installed on the surface of the display screen with a frame, the frame may be worn during repeated installation and removal of the screen protector, thereby affecting the stability of the screen protector mounted on the surface of the display screen.

To overcome the shortcomings, the present invention provides a magnetic fixing assembly for a screen protector to mitigate or obviate the aforementioned problems.

SUMMARY OF THE INVENTION

The main objective of the present invention is to provide a magnetic fixing assembly for a screen protector that is configured to detachably fix a screen protector on a surface of a display screen.

The magnetic fixing assembly for a screen protector comprises a fixing unit and a magnetic unit. The material of the fixing unit includes metal, and the fixing unit comprises a bottom surface, a top surface, and a first adhesive sheet. The bottom surface and the top surface are two opposite surfaces of the fixing unit. The first adhesive sheet is mounted on the bottom surface.

The magnetic unit is detachably mounted on the fixing unit and is magnetically attached to the fixing unit. The magnetic unit comprises a connecting part, an extending part, and at least one magnet. The connecting part is detachably mounted on the fixing unit and comprises a connecting surface. The connecting surface faces the top surface of the fixing unit. The extending part is mounted on a side of the connecting part and extends from said side of the connecting part. The extending part comprises an inner surface and a second adhesive sheet. The inner surface faces the fixing unit, and the second adhesive sheet is mounted on the inner surface of the extending part. The at least one magnet is mounted on the connecting part and faces the top surface of the fixing unit.

The advantage of the present invention is that the screen protector is attached to the extending part of the magnetic unit, the fixing unit is attached to the border of the display screen, and the magnetic unit and the fixing unit are magnetically attracted to each other. Therefore, the user can remove the screen protector from the display screen or can replace the original screen protector with another screen protector with different functions at any time. In addition, installing the screen protector through the magnetic force prevents the magnetic unit and the fixing unit from being worn during disassembly and assembly, thereby maintaining the stability of the screen protector on the surface of the display screen and extending the life of the magnetic fixing assembly of the screen protector.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
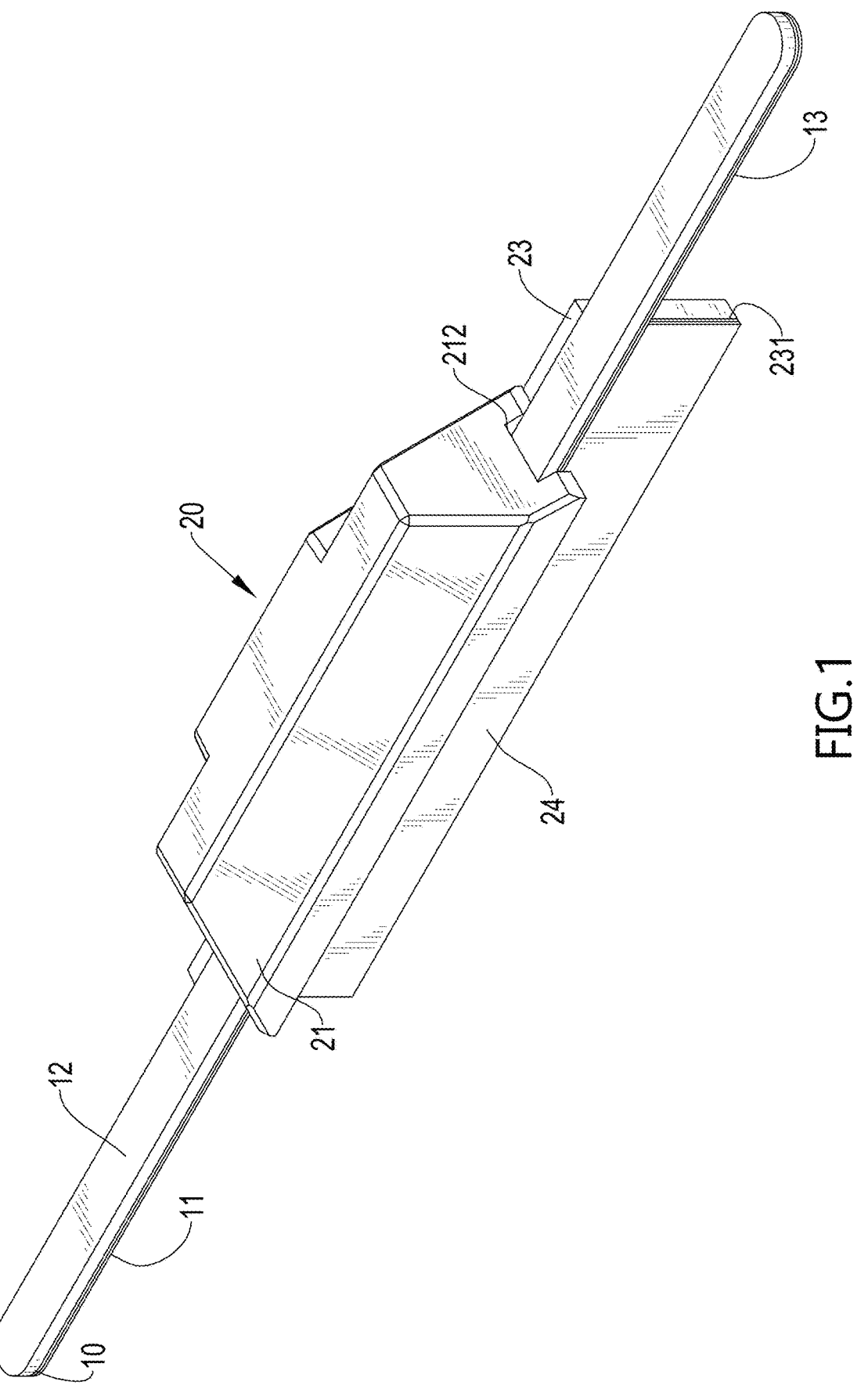
FIG. 1 is a perspective view of a magnetic fixing assembly for a screen protector in accordance with the present invention.
Figure 2:
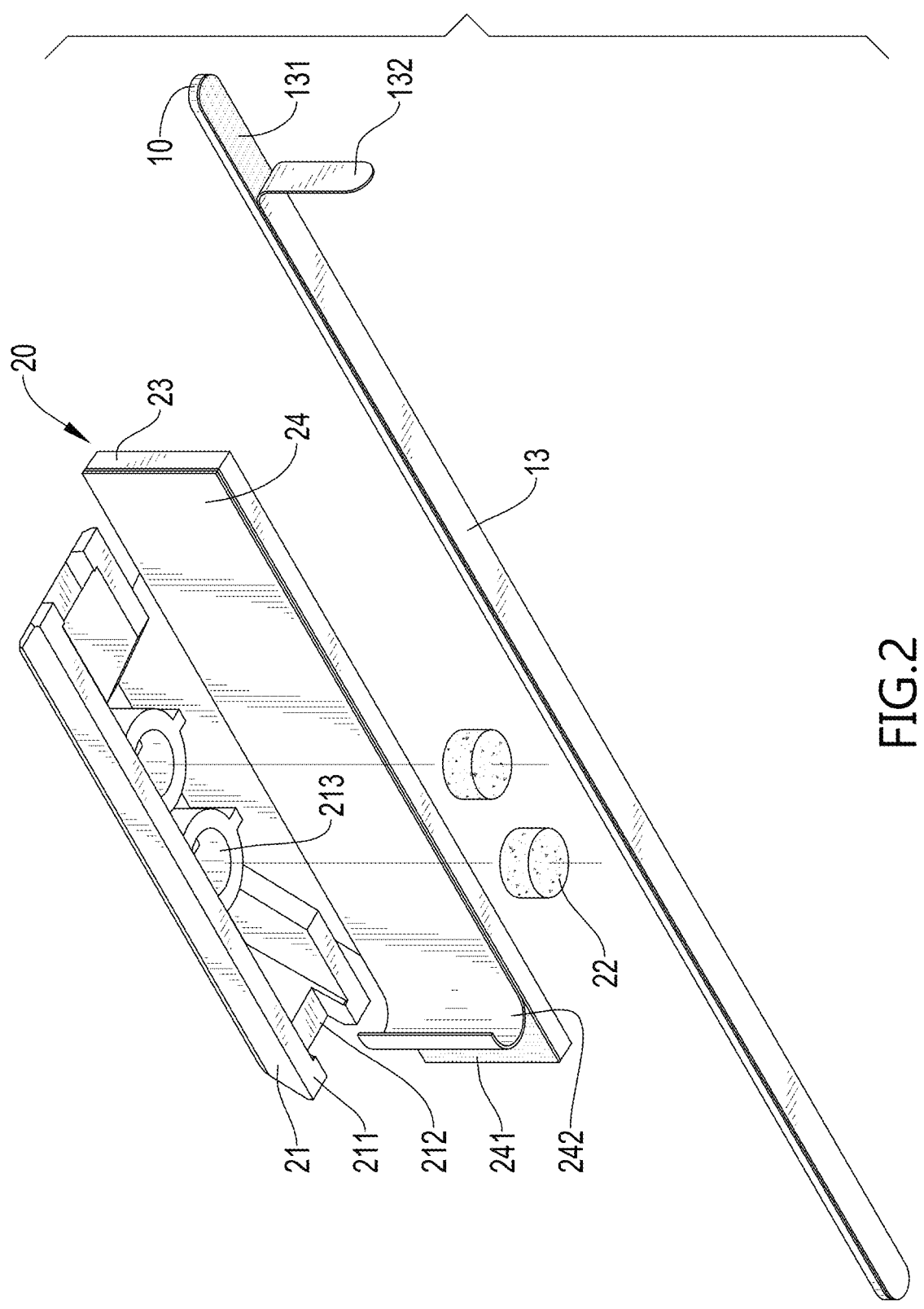
FIG. 2 is an exploded view of the magnetic fixing assembly for a screen protector in FIG. 1.
Figure 3:
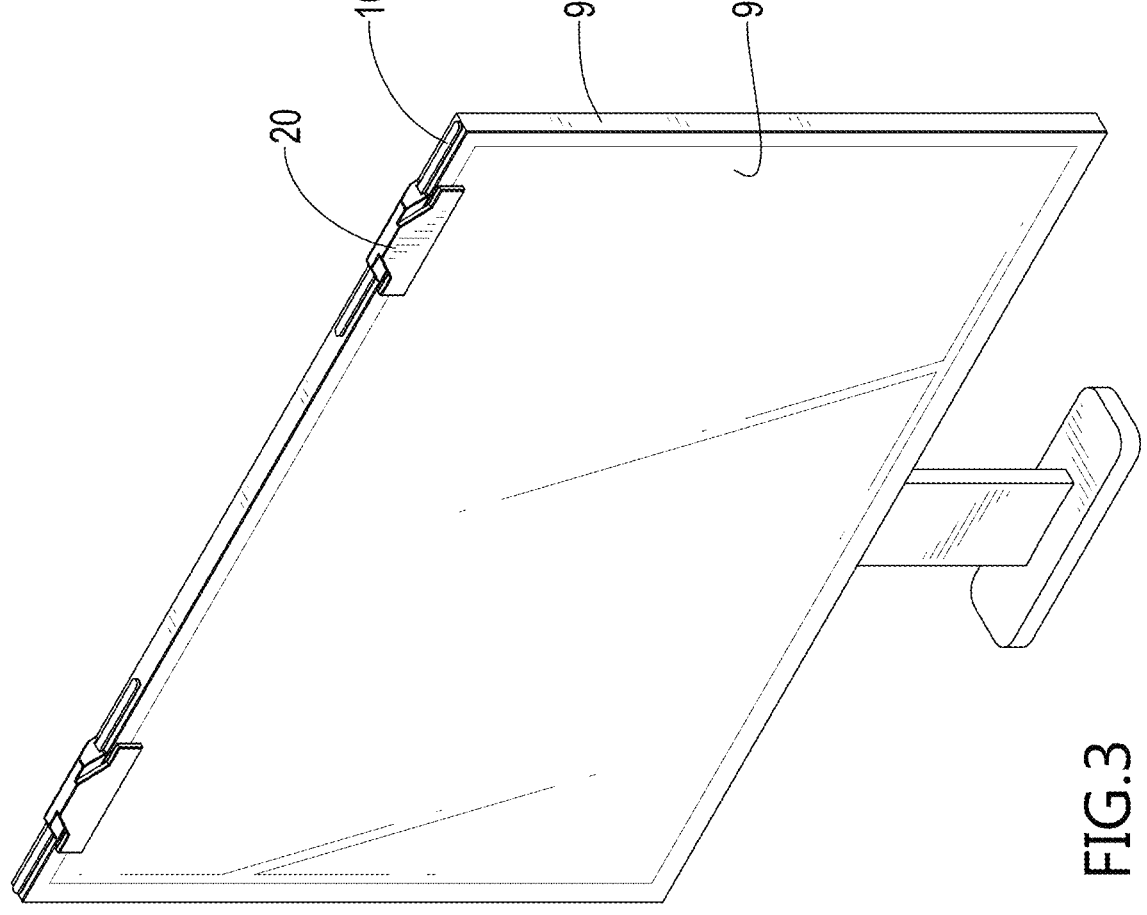
FIG. 3 is a perspective view of the magnetic fixing assembly for a screen protector in FIG. 1, shown in use.
Figure 4:
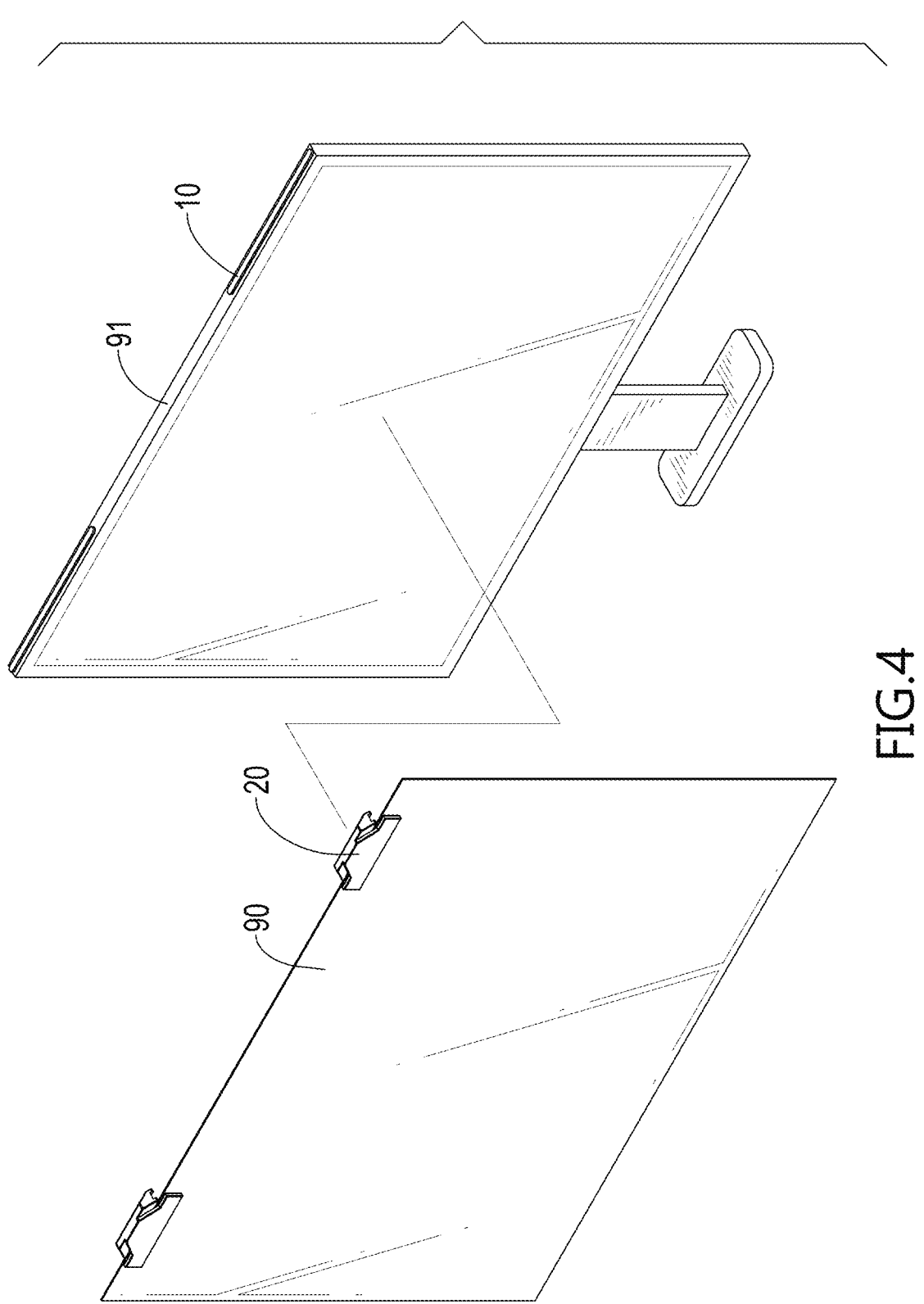
FIG. 4 is an exploded view of the magnetic fixing assembly for a screen protector in FIG. 1, shown in use.
Figure 5:
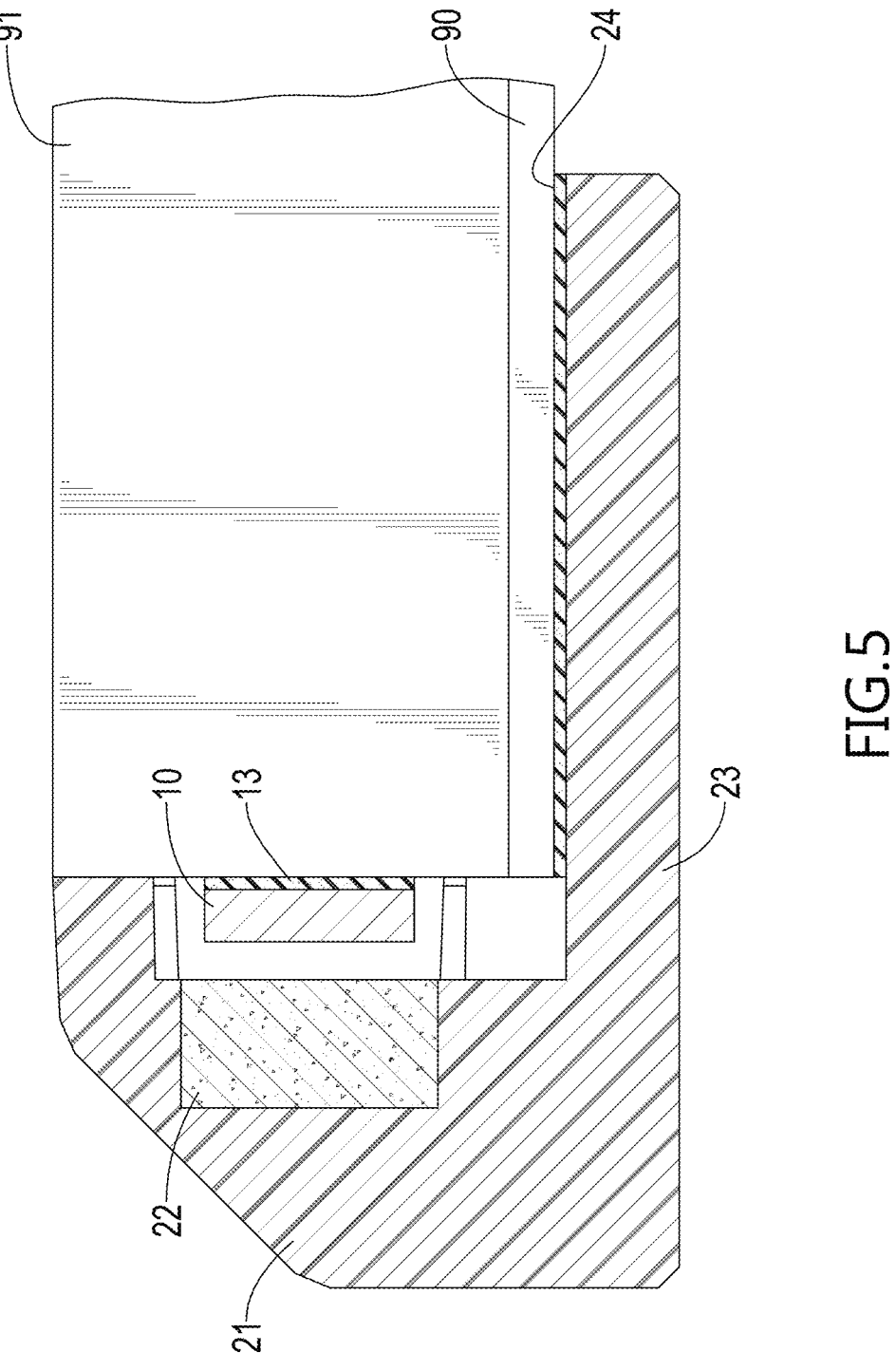
FIG. 5 is an enlarged sectional view of the magnetic fixing assembly for a screen protector in FIG. 1, shown in use.

With reference to FIG. 1 to FIG. 5, a magnetic fixing assembly for a screen protector in accordance with the present invention is configured to detachably fix a screen protector 90 on a surface of a display screen 91. The magnetic fixing assembly for a screen protector comprises a fixing unit 10 and a magnetic unit 20.

The fixing unit 10 is configured to be attached to a border of the display screen 91, and the material of the fixing unit 10 includes metal. The fixing unit 10 comprises a bottom surface 11, a top surface 12 and a first adhesive sheet 13. The bottom surface 11 and the top surface 12 are two opposite surfaces of the fixing unit 10, and the bottom surface 11 faces the border of the display screen 91. The first adhesive sheet 13 is mounted on the bottom surface 11 of the fixing unit 10 and comprises a first adhesive layer 131 and a first release film 132. The first adhesive layer 131 is mounted on the bottom surface 11 of the fixing unit 10, and the first release film 132 is detachably attached to the first adhesive layer 131. When the first release film 132 and the first adhesive layer 131 are separated, the fixing unit 10 can be attached to the border of the display screen 91 through the first adhesive layer 131 of the first adhesive sheet 13.

The magnetic unit 20 comprises a connecting part 21, at least one magnet 22 and an extending part 23. The connecting part 21 is detachably mounted on the fixing unit 10 and comprises a connecting surface 211 and a groove 212. The connecting surface 211 faces the top surface 12 of the fixing unit 10, and the groove 212 is formed in the connecting surface 211. Therefore, when the connecting part 21 is mounted on the fixing unit 10, the fixing unit 10 is located in the groove 212 of the connecting part 21. The groove 212 comprises at least one magnet cavity 213, and the at least one magnet cavity 213 is formed in a bottom groove surface of the groove 212. The at least one magnet 22 is mounted in the at least one magnet cavity 213 of the groove 212. When the connecting part 21 is mounted on the fixing unit 10, the at least one magnet 22 is corresponding to the top surface 12 of the fixing unit 10 in location, and a surface of each magnet 22 close to the top surface 12 of the fixing unit 10 is aligned with the bottom groove surface of the groove 212. In this embodiment, the groove 212 comprises two magnet cavities 213, and the magnetic unit 20 comprises two magnets 22. The magnet cavities 213 are formed side by side in the bottom groove surface of the groove 212, and each one of the magnets 22 is mounted in a respective one of the magnet cavities 213. In another embodiment, the amount of the magnet cavity 213 and the amount of the magnet 22 are not limited thereto.

In this embodiment, the fixing unit 10 is a metal strip, and the magnets 22 are mounted on the connecting part 21 of the magnetic unit 20. Therefore, the magnetic unit 20 can be magnetically attracted to the fixing unit 10. In another embodiment, the fixing unit 10 can be a magnet, and the material of the magnetic unit 20 includes metal, or both the fixing unit 10 and the magnetic unit 20 have magnetism, as long as the magnetic unit 20 can be magnetically attracted to the fixing unit 10.

The extending part 23 is mounted on a side of the connecting part 21 and extends from said side of the connecting part 21. The extending part 23 comprises an inner surface 231 and a second adhesive sheet 24. The inner surface 231 faces the fixing unit 10. An angle is between the inner surface 231 of the extending part 23 and the connecting surface 211 of the connecting part 21, and the angle is 90 degrees in this embodiment. The second adhesive sheet 24 is mounted on the inner surface 231 of the extending part 23 and comprises a second adhesive layer 241 and a second release film 242. The second adhesive layer 241 is mounted on the inner surface 231 of the extending part 23, and the second release film 242 is detachably attached to the second adhesive layer 241. When the second release film 242 and the second adhesive layer 241 are separated, the screen protector 90 can be attached to the extending part 23 of the magnetic unit 20 through the second adhesive layer 241 of the second adhesive sheet 24.

The user first removes the second release film 242 of the second adhesive sheet 24, and attaches the screen protector 90 to the extending part 23 of the magnetic unit 20 through the second adhesive layer 241. Then the magnetic unit 20 and the fixing unit 10 are magnetically attracted to each other. The user finally removes the first release film 132 of the first adhesive sheet 13, and attaches the fixing unit 10 to the border of the display screen 91 through the first adhesive layer 131. In this embodiment, the fixing unit 10 is located on a location of the border of the display screen 91, and said location of the border of the display screen 91 is perpendicular to the surface of the display screen 91. In another embodiment, the angle between the inner surface 231 of the extending part 23 and the connecting surface 211 of the connecting part 21 can be 180 degrees, and the fixing unit 10 can be located on a location of the border of the display screen 91, and said location of the border of the display screen 91 is on the same plane as the surface of the display screen 91.

The advantage of the present invention is that the screen protector 90 is attached to the extending part 23 of the magnetic unit 20, and the fixing unit 10 is attached to the border of the display screen 91, and the magnetic unit 20 and the fixing unit 10 are magnetically attracted to each other. Therefore, the user can remove the screen protector 90 from the display screen 91 or can replace the original screen protector 90 with another screen protector 90 with different functions at any time. In addition, installing the screen protector 90 through the magnetic force prevents the magnetic unit 20 and the fixing unit 10 from being worn during disassembly and assembly, thereby maintaining the stability of the screen protector 90 on the surface of the display screen 91 and extending the life of the magnetic fixing assembly of the screen protector.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic fixing assembly for a screen protector comprising:
   a fixing unit; a material of the fixing unit including metal;
      the fixing unit comprising:
      a bottom surface;
      a top surface opposite to the bottom surface; and
      a first adhesive sheet mounted on the bottom surface; and
   a magnetic unit detachably mounted on the fixing unit and magnetically attached to the fixing unit; the magnetic unit comprising:
      a connecting part detachably mounted on the fixing unit; the connecting part comprising:
      a connecting surface facing the top surface of the fixing unit; and
      a groove formed in the connecting surface; the fixing unit detachably mounted in the groove; the groove comprising:
      at least one magnet cavity formed at a bottom groove surface of the groove;
      an extending part mounted on a side of the connecting part; the extending part comprising:
      an inner surface facing the fixing unit; and
      a second adhesive sheet mounted on the inner surface of the extending part; and
      at least one magnet mounted in the at least one magnet cavity of the groove of the connecting part and facing the top surface of the fixing unit.

2. The magnetic fixing assembly for a screen protector as claimed in claim 1, wherein:
   the least one magnet cavity includes two said magnet cavities, and the two magnet cavities are formed side by side in the groove;
   the at least one magnetic includes two said magnets, and each one of the two magnets is mounted in a respective one of the two magnet cavities.

3. The magnetic fixing assembly for a screen protector as claimed in claim 1, wherein the connecting surface of the connecting part is perpendicular to the inner surface of the extending part.

4. The magnetic fixing assembly for a screen protector as claimed in claim 2, wherein the connecting surface of the connecting part is perpendicular to the inner surface of the extending part.

5. The magnetic fixing assembly for a screen protector as claimed in claim 1, wherein the first adhesive sheet comprises:

a first adhesive layer mounted on the bottom surface of the fixing unit;

a first release film detachably attached to the first adhesive layer.

6. The magnetic fixing assembly for a screen protector as claimed in claim 4, wherein the first adhesive sheet comprises:

a first adhesive layer mounted on the bottom surface of the fixing unit;

a first release film detachably attached to the first adhesive layer.

7. The magnetic fixing assembly for a screen protector as claimed in claim 1, wherein the second adhesive sheet comprises:

a second adhesive layer mounted on the inner surface of the extending part;

a second release film detachably attached to the second adhesive layer.

8. The magnetic fixing assembly for a screen protector as claimed in claim 6, wherein the second adhesive sheet comprises:

a second adhesive layer mounted on the inner surface of the extending part;

a second release film detachably attached to the second adhesive layer.

\* \* \* \* \*